United States Patent
Wang

(10) Patent No.: US 10,552,034 B2
(45) Date of Patent: Feb. 4, 2020

(54) DISPLAY PROCESSING METHOD, DISPLAY PROCESSING SYSTEM AND ELECTRONIC DEVICE

(71) Applicant: BOE TECHNOLOGY GROUP CO., LTD., Beijing (CN)

(72) Inventor: Yongbo Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/944,969

(22) Filed: Apr. 4, 2018

(65) Prior Publication Data

US 2019/0087079 A1    Mar. 21, 2019

(30) Foreign Application Priority Data

Sep. 21, 2017   (CN) .......................... 2017 1 0861719

(51) Int. Cl.
   *G06F 3/0488*    (2013.01)
(52) U.S. Cl.
   CPC ............................... *G06F 3/04883* (2013.01)

(58) Field of Classification Search
None
See application file for complete search history.

(56) References Cited

U.S. PATENT DOCUMENTS

| | | | |
|---|---|---|---|
| 7,239,305 B1 * | 7/2007 | Nakano ................. | G06F 3/0488 345/173 |
| 2009/0058821 A1 * | 3/2009 | Chaudhri ............ | G06F 3/04817 345/173 |
| 2010/0333004 A1 * | 12/2010 | Kristiansen ......... | G06F 3/04883 715/765 |
| 2015/0346976 A1 * | 12/2015 | Karunamuni ....... | G06F 3/04817 715/765 |

\* cited by examiner

*Primary Examiner* — Nicholas J Lee
(74) *Attorney, Agent, or Firm* — Collard & Roe, P.C.

(57) ABSTRACT

A display processing method, a display processing system and an electronic device are disclosed. The display processing method includes: acquiring a touch operation on a first display area, the touch operation being detected by a touch operation device; recognizing the touch operation according to a preset rule to obtain a recognition result; and generating a control instruction based on the recognition result to control a display operation of an electronic device.

15 Claims, 6 Drawing Sheets

0000 0000 0000 0000 0000 0000 0000
0000 0000 0000 0000 0000 0000 0000
0000 0000 0000 0000 0000 0000 0000
0000 0000 0000 0000 0000 0000 0000
0000 0000 0000 0000 0000 0000 0000
Fig. 6a
0000 0000 0000 0000 0000 0000 0000
0000 0000 0000 0000 0000 0000 0000
0000 0000 1111 0000 0000 0000 0000
0000 0000 0000 0000 0000 0000 0000
0000 0000 0000 0000 0000 0000 0000
Fig. 6b
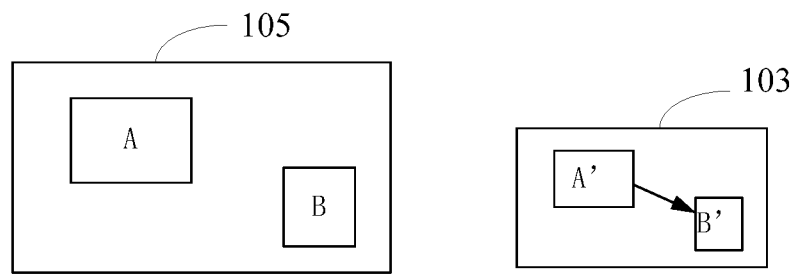
Fig. 7a
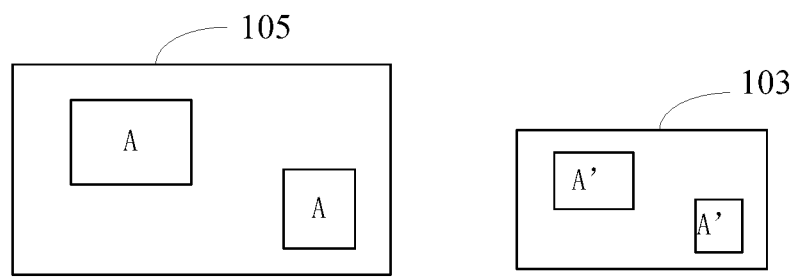
Fig. 7b

US 10,552,034 B2

DISPLAY PROCESSING METHOD, DISPLAY PROCESSING SYSTEM AND ELECTRONIC DEVICE

CROSS-REFERENCE TO RELATED APPLICATION

The present application claims priority to Chinese patent application No. 201710861719.8, filed on Sep. 21, 2017, the entire disclosure of which is incorporated herein by reference as part of the present application.

TECHNICAL FIELD

The present disclosure relates to a display processing method, a display processing system and an electronic device.

BACKGROUND

With development of technology, liquid crystal display (LCD) screens can be seen to be used for various applications everywhere, such as liquid crystal display televisions, mobile phones, medical displays and so on. Materials of the liquid crystal display screens are generally glasses, which are easily broken. In addition, the quantity of pixels is too large and each pixel is very small, therefore the phenomenon of individual pixel breakdown often occurs, which is known as a malfunctioned pixel, and the malfunctioned pixel is usually difficult to repair. If the malfunctioned pixel exceeds a certain standard, the entire display screen should be replaced. In some applications, the price of the replacement of one LCD screen is generally very expensive. In order to prevent LCD screens from being damaged, the LCD screens employed in the medical field, such as the medical displays, and the displays used in monitor display systems are generally provided with protective plates that are used for the LCD screens.

SUMMARY

According to an aspect of the present disclosure, at least one embodiment provides a display processing method, the method comprises: acquiring a touch operation on a first display area, the touch operation being detected by a touch operation device; recognizing the touch operation according to a preset rule to obtain a recognition result; and generating a control instruction based on the recognition result to control a display operation of an electronic device.

According to another aspect of the present disclosure, at least one embodiment further provides an electronic device, the electronic device comprises a plurality of display areas, and the electronic device comprises: a processor; and a non-transitory memory that is configured to store computer program instructions, the computer program instructions are adapted to be executed by the processor to cause the processor to perform a following method comprising: acquiring a touch operation on a first display area, the touch operation being detected by a touch operation device; recognizing the touch operation according to a preset rule to obtain a recognition result; and generating a control instruction based on the recognition result to control a display operation of the electronic device.

According to another aspect of the present disclosure, at least one embodiment further provides a display processing system, the display processing system comprises: a plurality of display signal sources; a touch operation device; and the above electronic device configured to receive data of the plurality of display signal sources.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 6a is a schematic diagram of an original state of a pixel matrix of a touch operation device according to an embodiment of the present disclosure;

FIG. 6b is a schematic diagram of a state change of a pixel matrix of a touch operation device according to an embodiment of the present disclosure;

FIG. 7a is a schematic diagram of switching of a display signal source according to an embodiment of the present disclosure;

FIG. 7b is a schematic diagram of switching of a display signal source according to an embodiment of the present disclosure;

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. It should be noted that, the terms "first," "second," etc., which are used in the description and the claims of the present application for disclosure, are not intended to indicate any sequence, amount or importance, but distinguish various similar components. It should be understood that data used herein may be interchanged where appropriate, so that the embodiments of the present disclosure described herein can be implemented in addition to orders illustrated or described herein. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. For example, processes, methods, systems, products, or devices, that comprise a series of steps or units, are not limited to those steps or units that are explicitly listed, but may include other steps or units that are not explicitly listed or are inherent to these processed, methods, products, or devices. The phrases "connect", "connected", etc., are not intended to define a physical connection or mechanical connection, but can include an electrical connection, directly or indirectly. "On," "under," "right," "left" and the like are only used to indicate relative position relationship, and when the position of the object which is described is changed, the relative position relationship can be changed accordingly.

Because medical displays and displays in monitor display systems often need a picture-in-picture function, when a user (such as a doctor or a nurse) switches a position of the picture-in-picture or switches a signal source, because a protective plate is arranged on the front of the display, the user needs to operate a specific button of a display frame manually or use a remote control to switch the position of the picture-in-picture or switch the signal source, which is not convenient for the user to operate and also brings some hidden dangers for the medical and diagnostic process.

Figure 1:
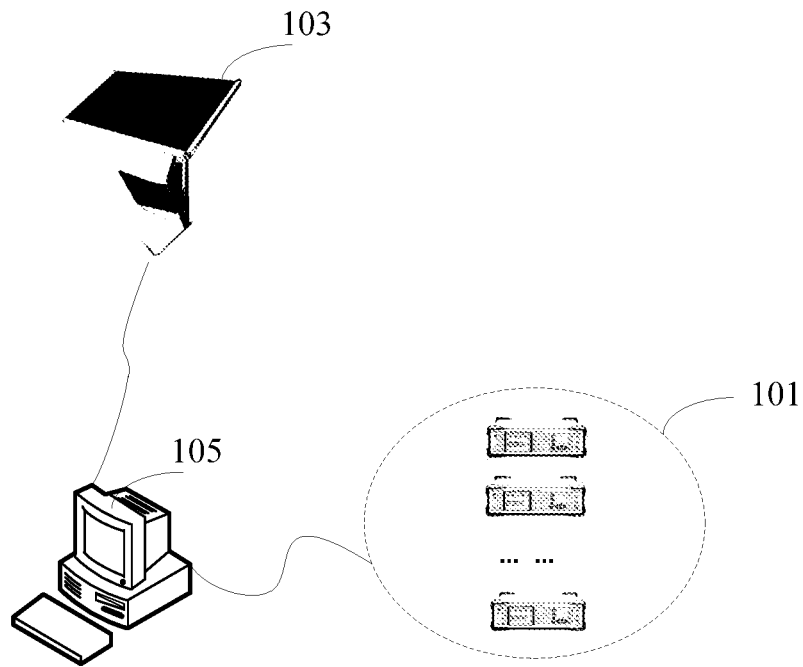
FIG. 1 is a schematic diagram of an environment of a display processing system according to an embodiment of the present disclosure.

At least one embodiment of the present disclosure provides a display processing system, the display processing system comprises an environment as illustrated in FIG. 1, and the environment can comprise a hardware environment and a network environment. The above-mentioned hardware environment comprises a plurality of display signal sources 101, a touch operation device 103 and an electronic device 105. It should be noted that the hardware environment and structure that are illustrated in FIG. 1 are merely exemplary but not restrictive; the hardware environment can also comprise other components and structures according to requirements, for example, can comprise a server and so on.

It should be noted that the electronic device 105 receives data from the plurality of display signal sources 101. The electronic device 105 acquires a touch operation from the touch operation device 103 and controls a display operation of the electronic device 105 according to the touch operation that is acquired from the touch operation device 103.

The above-mentioned electronic device 105 can comprise a built-in display or an external display, the built-in display or the external display can be equipped with a protective plate, and for example, a display screen in a medical electronic device, a display in a monitor device or the like equipped with a protective plate. The electronic device, such as a mobile phone, a tablet computer, a notebook computer or the like, is a mobile terminal that is equipped with a protective plate. The mobile terminal can also be a portable, pocket-sized, handheld, computer built-in or vehicle mounted mobile device. Optionally, the electronic device 105 comprises at least one display, the display can be of various suitable type, such as a liquid crystal display, an organic light emitting display, a cathode ray tube (CRT) display and so on, the embodiments of the present disclosure are not limited in this aspect.

The plurality of display signal sources 101 comprise at least two display signal sources, the plurality of display signal sources 101 comprise, but are not limited to: an HDMI (High Definition Multimedia Interface) display signal source, a DVI (Digital Visual Interface) display signal source, a USB (Universal Serial Bus) signal source, and a VGA (Video Graphics Array) display signal source. The electronic device 105 can receive data of the plurality of display signal sources 101. The electronic device 105 can comprise a plurality of display areas, and each display area displays a data content of one of the display signal sources.

For example, the touch operation device 103 can comprise a touch screen or a touch panel. The touch screen and the touch panel can be of, but are not limited to, a resistive type, a capacitive type, an infrared type, a surface acoustic wave type, and so on.

As illustrated in FIG. 1, the electronic device 105 can comprise at least one built-in or external processor. When the electronic device 105 comprise at least one built-in processor, the at least one built-in processor and the electronic device 105 are integrated as a whole. When the electronic device 105 comprise at least one external processor, the electronic device can be connected to the at least one external processor through a wired or a wireless network, and the at least one external processor can be used for processing the touch operation that is acquired from the touch operation device 103.

The above-mentioned wireless network comprises, but is not limited to, a wide area network, a metropolitan area network, a local area network or a mobile data network. Typically, the mobile data network comprises but is not limited to a global system for mobile communications (GSM) network, a code division multiple access (CDMA) network, a wideband code division multiple access (WCDMA) network, a long term evolution (LTE) communication network, a WIFI network, a ZigBee network, a network based on Bluetooth technology and so on. Different types of communication networks can be operated by different operators. The type of the communication network does not limit the embodiments of the present disclosure.

Through the above-mentioned embodiments of the present disclosure, a user (a doctor or a nurse) can perform a touch operation through the touch operation device 103, the electronic device recognizes the user's action gesture based on the touch operation of the touch operation device 103 and switches a picture-in-picture position and the signal source of the electronic device. It is convenient for users to operate and it also brings benefits for the medical, diagnostic processes.

Figure 2:
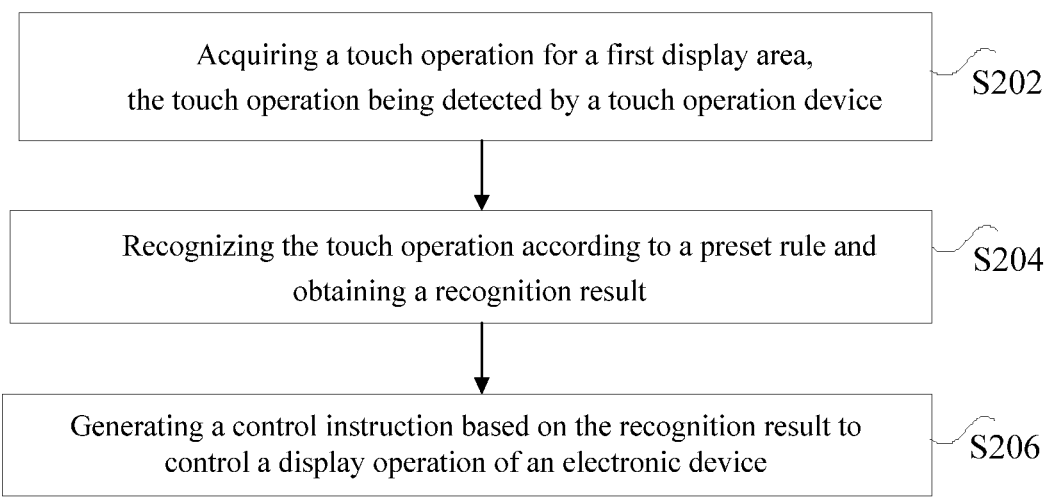
FIG. 2 is a flow diagram of a display processing method according to an embodiment of the present disclosure.

In an above operating environment, at least one embodiment of the present disclosure provides a flow diagram of a display processing method as illustrated in FIG. 2, and the method can be applied to the electronic device 105. It should be noted that the steps as illustrated in the flow diagram of the accompanying drawings can be performed, for example, in a computer system in which a group of computers can execute instructions. In addition, although a logical order is illustrated in the flow diagram, in some situations, the steps that are illustrated or described can be performed in an order different from the order here. As illustrated in FIG. 2, the method can comprise following steps:

Step S202, acquiring a touch operation on a first display area, the touch operation being detected by a touch operation device;

Step S204, recognizing the touch operation according to a preset rule to obtain a recognition result; and Step S206, generating a control instruction based on the recognition result to control a display operation of an electronic device.

It should be noted that the electronic device 105 can have a picture-in-picture function. When the electronic device 105 starts the picture-in-picture function, the electronic device 105 can comprise a plurality of display areas. Each display area can receive data of one display signal source, and display the received data of the display signal source.

When the electronic device 105 starts the picture-in-picture function, in the step S202, the touch operation on the first display area can be acquired from the touch operation device 103. The touch operation device 103 can comprise a plurality of touch operation areas corresponding to the plurality of display areas of the electronic device 105. For example, a position corresponding relationship between the plurality of touch operation areas and the plurality of display areas is a relative position correspondence, a serial number correspondence and so on. In addition, the position corresponding relationship can be preset or modified in a control system or an operation system.

It should be noted that the touch operation device 103 can be an entire touch screen or touch panel. The touch operation device 103 can also have a display function that is used for displaying the plurality of touch operation areas corresponding to the plurality of display areas of the electronic device 105.

Figure 3:
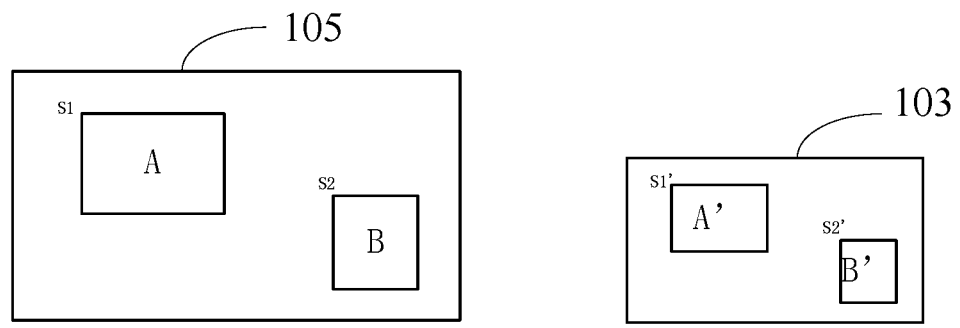
FIG. 3 is a displaying schematic diagram of a touch operation device and an electronic device according to an embodiment of the present disclosure.

In an optional embodiment, as illustrated in FIG. 3, the electronic device 105 displays a picture of an A display signal source at a first position S1 and displays a picture of a B display signal source at a second position S2, therefore the touch operation device 103 displays a touch operation area A' of the A display signal source at S1' corresponding to the first position S1 and displays a touch operation area B' of the B display signal source at S2' corresponding to the second position S2. The touch operation device 103 displays the plurality of touch operation areas corresponding to the plurality of display areas of the electronic device 105 in a proportional relationship. Optionally, the plurality of touch operation areas of the touch operation device 103 can display the data of the display signal sources corresponding to the plurality of display areas of the electronic device 105, which is more convenient for operation.

The above-described touch operation can comprise factors, such as a touch position, touch time and so on. Acquiring the touch operation from the touch operation device 103 can comprise acquiring the touch position and the touch time of an operating body touching the touch operation device 103, and the operating body can be, for example, a finger or a stylus.

After the touch operation is acquired from the touch operation device 103, in the step S204, the touch operation can be recognized according to the preset rule to obtain the recognition result. In the step S206, the control instruction can be generated based on the recognition result to control the display operation of the electronic device. The preset rule, for example, can be preset in a control system software or in an operation system software.

Through the above-mentioned embodiments of the present disclosure, the user can perform a touch operation through the touch operation device 103. The electronic device recognizes the action gesture of the user based on the touch operation of the touch operation device 103 and switches the picture-in-picture position and the signal source of the electronic device. It is not only convenient, fast, but also greatly enhances user experience.

In addition, according to an embodiment of the present disclosure, in the step S204, the operation of recognizing the touch operation according to the preset rule to obtain the recognition result can comprise: acquiring a first position of the touch operation on the touch operation device; determining whether holding time of the touch operation on the first position exceeds a threshold and obtaining a determination result; and in a case where the determination result indicates that the holding time of the touch operation on the first position exceeds the threshold and the first position is located at a first touch operation area corresponding to the first display area of the electronic device, activating the first display area.

The touch operation device 103 can detect a touch and locate a touch position, so that the touch operation device 103 can obtain a first position of the touch. For example, the touch operation device 103 can comprise a touch driving circuit (for example, a touch driving chip) and a sensor array. The touch driving circuit, for example, continuously scans according to a predetermined sequence, therefore corresponding physical quantities (for example, capacitance, resistance, illumination and so on) of the sensor array can be detected to determine whether a touch exits and a position that is touched. After obtaining the data, the touch driving circuit sends the corresponding data to a processor (for example, a central processor) of the control system to feed back to the control system. For example, the control system can be triggered through an event, therefore the control system can further judge whether to perform feedback, or perform an operation corresponding to the event. These events comprise touch start (for example, putting down a pen), touch move, touch end (for example, lifting the pen) and so on. The touch operation device 103 can display the plurality of touch operation areas corresponding to the plurality of display areas of the electronic device 105 in a proportional relationship. Therefore the touch operation device 103 can use an address of a pixel to represent the located touch position. The first position can be a position of one or more pixels.

In the step S204, the electronic device 105 can perform the following operations: acquiring an address of a pixel of the touch operation on the touch operation device 103; determining whether the holding time of the touch operation on the pixel exceeds a threshold; and in a case of determining that the holding time of the touch operation on the pixel exceeds the threshold and the pixel is located at the first touch operation area corresponding to the first display area of the electronic device 105, activating the first display area. The above-described state of activating the first display area can be that the first display area can be operated.

Figure 4:
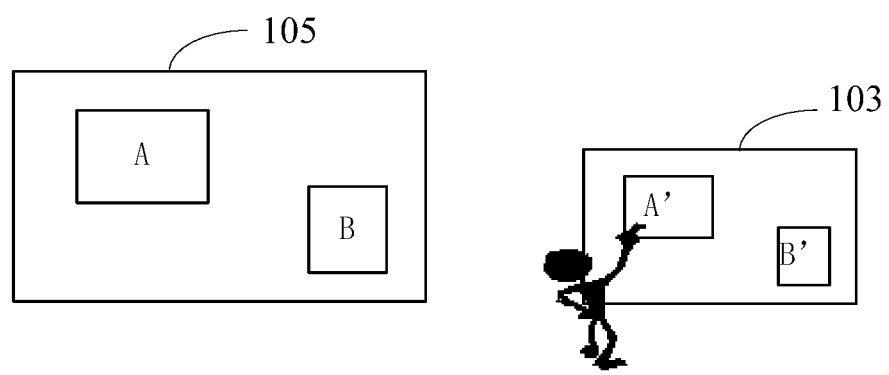
FIG. 4 is a schematic diagram of a touch operation of a touch operation device according to an embodiment of the present disclosure.
Figure 5:
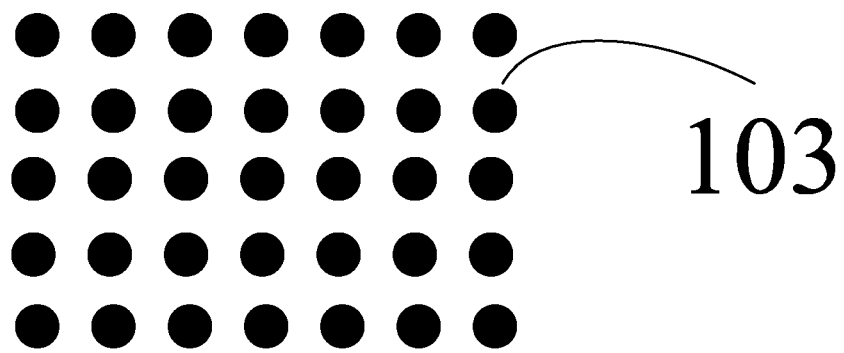
FIG. 5 is a schematic diagram of a pixel matrix of a touch operation device according to an embodiment of the present disclosure.

As illustrated in FIG. 4, the user only needs to perform a touch operation on the touch operation device 103 to shift the operation focus of the electronic device 105 to an area A, so that the area A can be operated. The above-described touch operation can be that the holding time at a pixel exceeds a threshold, and the threshold can be preset, for example, the threshold is one second and so on. Optionally, a pixel matrix of the touch operation device 103 is illustrated in FIG. 5, and an original state of each pixel is illustrated in FIG. 6*a*. When the holding time at a pixel exceeds the threshold, the pixel matrix changes as illustrated in FIG. 6*b*.

For example, in a case that the first display area of the electronic device is activated, the operation of recognizing the touch operation according to the preset rule to obtain the recognition result can comprise: acquiring second position information of the touch operation on the touch operation device; determining an activation order of a plurality of touch positions that are comprised in the second position information; and obtaining the recognition result according to the activation order of the plurality of touch positions that are comprised in the second position information.

That is to say, in a case where the first display area can be operated, a gesture operation is further recognized to obtain a movement trajectory of the gesture operation, the movement trajectory of the gesture operation can be represented by an activation order of a plurality of pixel addresses, and the recognition result can be obtained according to the activation order of the plurality of pixel addresses.

In addition, according to one embodiment of the present disclosure, in a case where the recognition result indicates that the activation order of the plurality of touch positions in the second position information is from the first touch operation area to a second touch operation area, a data content that is displayed in the first display area is switched to be displayed in a second display area; the first touch operation area corresponds to the first display area, and the second touch operation area corresponds to the second display area.

Figure 7C:
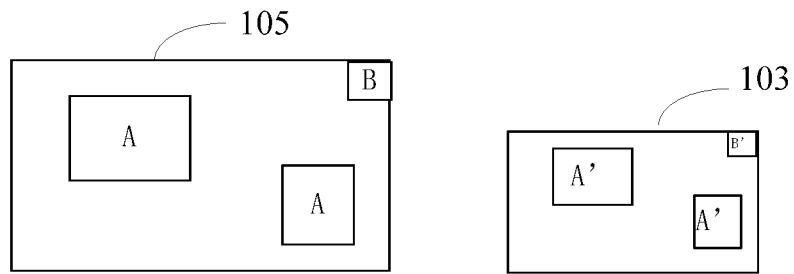
FIG. 7c is a schematic diagram of switching of a display signal source according to an embodiment of the present disclosure.

As illustrated in FIG. 7*a*, a display signal source in the area A needs to be switched to an area B to display, and the user only needs to move the touch operation from position A' to position B'. As illustrated in FIG. 7*b*, the electronic device 105 can automatically switch the display signal source that is displayed in the area B to the same display signal source as the area A, so that the signal switching is easily achieved. In this situation, data of a display signal source that is not displayed can also be displayed in a form of a small window to wait to be switched and used by the user, as illustrated in FIG. 7*c*.

Figure 8A:
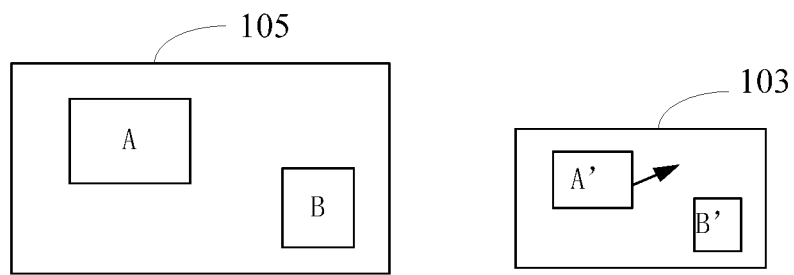
FIG. 8a is a schematic diagram of switching a position of a picture-in-picture according to an embodiment of the present disclosure.
Figure 8B:
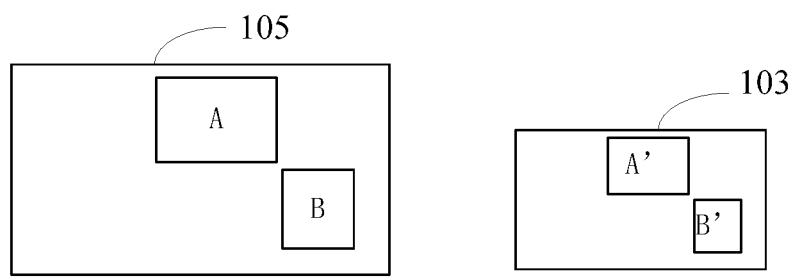
FIG. 8b is a schematic diagram of switching a position of a picture-in-picture according to an embodiment of the present disclosure.

In addition, according to one embodiment of the present disclosure, in a case where the recognition result indicates that the activation order of the plurality of touch positions in the second position information is from the first touch operation area to a position other than the plurality of touch operation areas, the first display area is moved to a position corresponding to the position other than the plurality of touch operation areas, as illustrated in FIG. 8*a* and FIG. 8*b*.

In addition, according to one embodiment of the present disclosure, in a case where the recognition result indicates that the activation order of the plurality of touch positions in the second position information is transferred via a touch position, the first display area is enlarged/reduced, for example, the first display area is scaled up or scaled down.

Figure 9A:
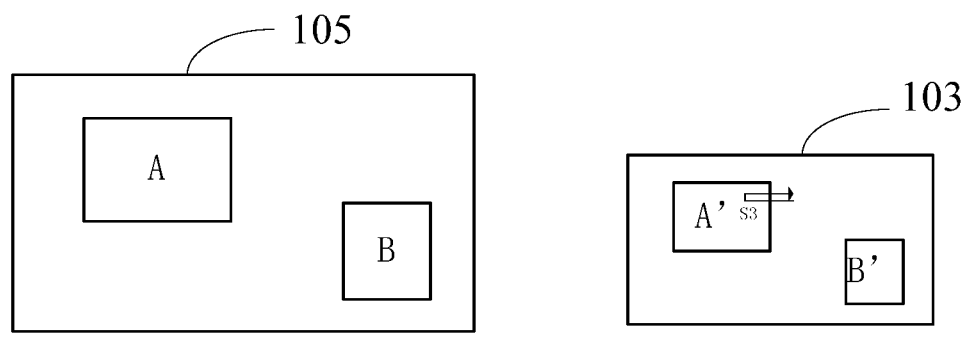
FIG. 9a is an enlargement schematic diagram of a display area of an electronic device according to an embodiment of the present disclosure.
Figure 9B:
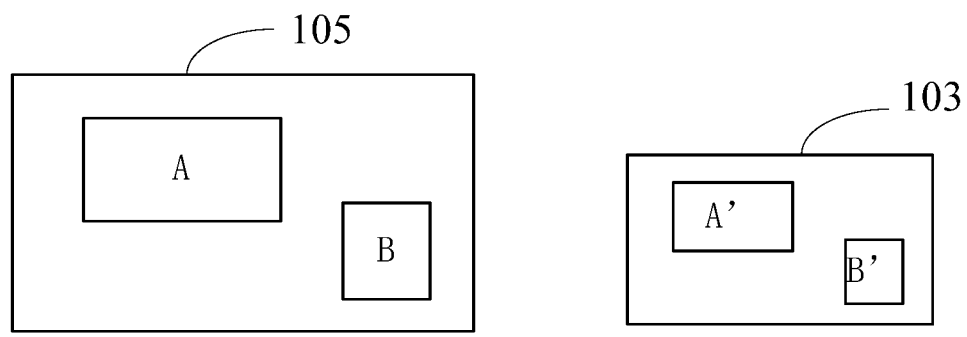
FIG. 9b is an enlargement schematic diagram of a display area of an electronic device according to an embodiment of the present disclosure.
Figure 9C:
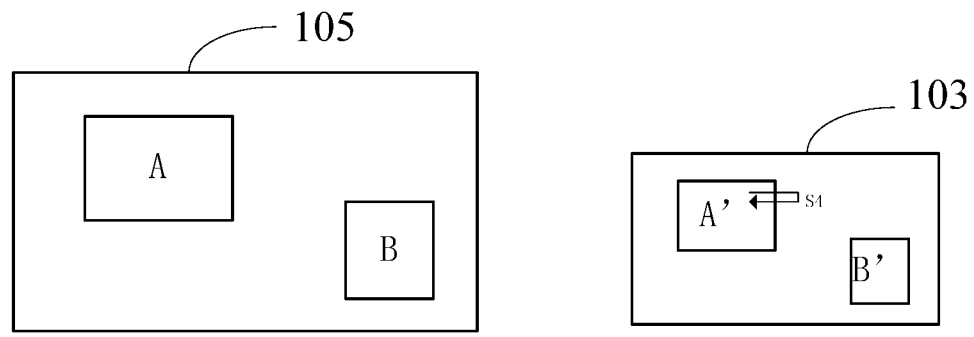
FIG. 9c is a reducing schematic diagram of a display area of an electronic device according to an embodiment of the present disclosure.
Figure 9D:
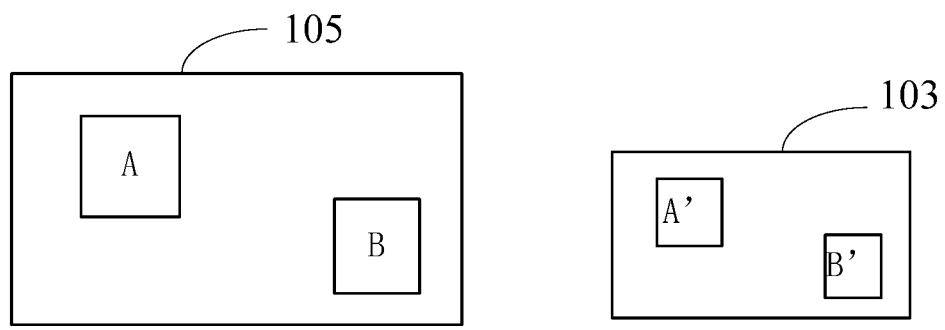
FIG. 9d is a reducing schematic diagram of a display area of an electronic device according to an embodiment of the present disclosure.

For example, as illustrated in FIG. 9*a* and FIG. 9*b*, in a case where the activation order of the plurality of touch positions is transferred via a touch position S3, the area A is enlarged, for example, to an operation size point, such as a touch end point. As illustrated in FIG. 9*c* and FIG. 9*d*, in a case where the activation order of the plurality of touch positions is transferred via a touch position S4, the area A is reduced, for example, to an operation size point, such as a touch end point.

Optionally, the user can also enlarge the first display area by double-clicking or moving the fingers away from each other, or reduce the first display area by moving the fingers close to each other, the present disclosure is not limited in this aspect.

Through the above embodiments of the present disclosure, the user can perform a touch operation through the touch operation device 103. The electronic device recognizes the action gesture of the user based on the touch operation of the touch operation device 103 and switches the picture-in-picture position and the signal source of the electronic device, it is not only convenient, fast, but also greatly enhances the user experience.

Through the above descriptions of the embodiments, those skilled in the art can clearly understand that the method according to the above embodiments can be implemented by means of software and a necessary universal hardware platform, and can also be implemented by hardware. However, in many situations, the former is a better embodiment. Based on this understanding, the technical solutions of the present disclosure essentially, or the part that contributes to the prior art, can be represented in the form of a software product, the software product of a computer can be stored in a memory medium (such as a ROM/RAM, a magnetic disk or an optical disk) and comprise a plurality of instructions used to cause a terminal device (which may be a mobile phone, a computer, a server, a network device and so on) to perform the method of the embodiments of the present disclosure.

Figure 10:
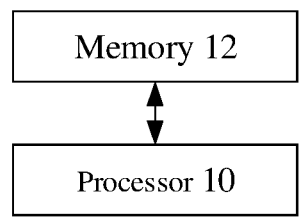
FIG. 10 is a schematic diagram of an electronic device according to an embodiment of the present disclosure.

According to the embodiments of the present disclosure, in the operation environment illustrated in FIG. 1 of the present disclosure, an electronic device is also provided, and the electronic device can be the electronic device 105. When the electronic device starts the picture-in-picture function, the electronic device can comprise a plurality of display areas. As illustrated in FIG. 10, the electronic device comprises a processor 10 and a memory 12. The memory 12 is configured to store computer program instructions, and the computer program instructions are adapted to be executed by the processor to cause the processor to perform a following method comprising the following operations:

Acquiring a touch operation on a first display area, the touch operation being detected by a touch operation device;

Recognizing the touch operation according to a preset rule to obtain a recognition result; and Generating a control instruction based on the recognition result to control a display operation of the electronic device.

The processor can be various suitable processors, such as a central processor, a microprocessor, an embedded processor and so on, and can be implemented in architectures, such as X86, ARM and so on. The memory 12 can be any suitable non-transitory memory, comprising but not being limited to a magnetic memory device, a semiconductor memory device, an optical memory device and so on, the embodiments of the present disclosure are not limited in this aspect.

Figure 11:
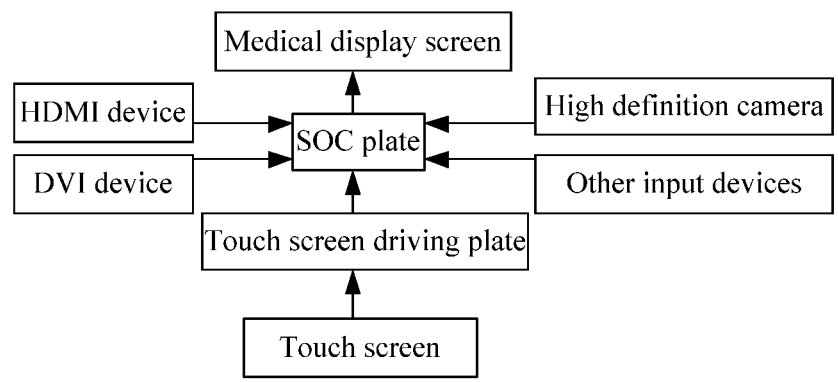
FIG. 11 is a schematic diagram of a medical electronic device according to an embodiment of the present disclosure.

For example, as illustrated in FIG. 11, the electronic device 105, for example, is a medical electronic device, the medical electronic device is externally provided with a medical display screen with a protective plate, and the display screen can be various suitable display device. A system on chip (SOC) is comprised inside the medical electronic device. The SOC, for example, can be implemented by an ARM processor that comprises components such as a central processing unit (CPU), a graphics processing unit (GPU) and so on. The medical display screen can be connected to the SOC through a VB1 or an eDP interface. The medical electronic device can judge a position of an operator's hand and a gesture operation through the SOC. The touch operation device 103, for example, is a touch screen, the touch screen can comprise a touch screen driving plate (for example, a touch driving chip), and the touch screen can be connected to the SOC through a USB interface. The plurality of display signal sources, for example, are HDMI devices, DVI devices, high definition cameras and/or other input devices.

In addition, according to one embodiment of the present disclosure, the processor can further load the computer program instructions to further perform the following operations: acquiring a first position of the touch operation on the touch operation device; determining whether holding time of the touch operation on the first position exceeds a threshold and obtaining a determination result; and in a case where the determination result indicates that the holding time of the touch operation on the first position exceeds the threshold and the first position is located at a first touch operation area corresponding to the first display area of the electronic device, activating the first display area.

In addition, according to one embodiment of the present disclosure, in a case where the first display area is activated, the processor can further load the computer program instructions to further perform the following operations: acquiring second position information of the touch operation on the touch operation device; determining an activation order of a plurality of touch positions that are comprised in the second position information; and obtaining the recognition result according to the activation order of the plurality of touch positions that are comprised in the second position information.

In addition, according to one embodiment of the present disclosure, in a case where the recognition result indicates that the activation order of the plurality of touch positions in the second position information is from the first touch operation area to a second touch operation area, a data content that is displayed in the first display area is switched to be displayed in the second display area; the first touch operation area corresponds to the first display area and the second touch operation area corresponds to the second display area.

In addition, according to one embodiment of the present disclosure, the electronic device comprises a plurality of display areas, the electronic device receives data of a plurality of display signal sources, and each display area of the electronic device displays a data content of one of the display signal sources.

In addition, according to one embodiment of the present disclosure, in a case where the recognition result indicates that the activation order of the plurality of touch positions in the second position information is transferred by a touch position, the first display area is enlarged/reduced, for example, the first display area is scaled up or scaled down.

In addition, according to one embodiment of the present disclosure, the touch operation device comprises a touch screen or a touch panel.

In addition, according to one embodiment of the present disclosure, the touch operation device is connected to the electronic device through a first interface, and for example the first interface is a USB interface.

Through the above embodiments of the present disclosure, the user can perform a touch operation through the touch operation device 103. The electronic device recognizes the action gesture (or gesture instruction) of the user based on the touch operation of the touch operation device and switches the picture-in-picture position and the signal source of the electronic device. It is not only convenient, fast, but also greatly enhances user experience.

It should be noted that, for the above embodiments of the system, the method and the electronic device, in order to describe clearly and simply, the system, the method and the electronic device are all described as a series of actions or a combination of modules, but those skilled in the art should know that the present disclosure is not limited to the described action orders or the connections of the modules. According to at least one embodiment of the present disclosure, some steps can be performed in other orders or performed at the same time, and some modules can be connected in other ways.

Those skilled in the art should also know that the embodiments described in the specification belong to one embodiment, above sequence numbers of the embodiments are only for description and the actions and modules involved are not necessarily required in the present disclosure.

In the above embodiments of the present disclosure, the description of each embodiment has its own emphasis. For parts that are not described in detail in one embodiment, reference may be made to the related descriptions in other embodiments.

In several embodiments provided in the present disclosure, it should be understood that the disclosed technical content can be implemented by other ways. The embodiments of the device described above are merely exemplary. For example, the division of a unit is merely a kind of logical function division, and the unit can be divided by other division ways in actual implementation. For example, a plurality of units or components can be combined or be integrated into another system, or some features can be ignored or not performed. In addition, the shown or discussed mutual coupling or direct coupling or communication connection can be indirect coupling or communication connection through some interfaces, units or modules, and can be electrical or other forms.

The units that are described as separate components can be or not be physically separated. The components that are used as display units can be or not be physical units, that is, the components can be located in one position or can also be distributed to a plurality of network units. Some or all of the units can be selected according to actual requirements to achieve the purposes of the solution in the embodiment.

In addition, each of the functional units in each embodiment of the present disclosure can be integrated in one processing unit, or each of the units can also exist separately and physically, or two or more units can be integrated in one unit. The above integrated unit can be implemented in a form of hardware or in a form of a software functional unit.

When the integrated unit is implemented in the form of a software functional unit and is sold or used as an independent product, the integrated unit can be stored in a computer readable memory medium. Based on this understanding, the technical solutions of the present disclosure essentially, or the part that contributes to the prior art, or the whole or part of the technical solutions can be represented in a form of a software product, the computer software product of a computer can be stored in a memory medium and comprise a plurality of instructions used to cause a computer device (which may be a personal computer, a server, a network device and so on) to perform the whole or part steps of the method in each of the embodiments of the present disclosure. The above memory medium comprises a volatile memory medium or a non-volatile memory medium, such as a USB flash disk, a read-only memory (ROM), a random access memory (RAM), a removable hard disk, a magnetic disk, an optical disk or other media that can store program codes.

The above descriptions are only preferred embodiments of the present disclosure, it should be noted that those skilled in the art may make some improvements and modifications without departing from the principle of the present disclosure, and the improvements and modifications should be considered to be within the protection scope of the present disclosure.

What is claimed is:

1. A display processing method, comprising:
    acquiring a touch operation on a first display area, wherein the touch operation is detected by a touch operation device;
    recognizing the touch operation according to a preset rule to obtain a recognition result; and
    generating a control instruction based on the recognition result to control a display operation of an electronic device;
    wherein the touch operation device and the electronic device are separately provided, and the touch operation device comprises a plurality of touch operation areas for touch operation and has a display function,
    the electronic device comprises a plurality of display areas, and the plurality of touch operation areas are in one-to-one correspondence with the plurality of display areas.

2. The display processing method according to claim 1, wherein recognizing the touch operation according to the preset rule to obtain the recognition result comprises:
    acquiring a first position of the touch operation;
    determining whether holding time of the touch operation on the first position exceeds a threshold and obtaining a determination result; and
    in a case where the determination result indicates that the holding time of the touch operation on the first position exceeds the threshold and the first position is located at a first touch operation area corresponding to the first display area, activating the first display area.

3. The display processing method according to claim 2, wherein in a case where the first display area is activated, recognizing the touch operation according to the preset rule to obtain the recognition result comprises:
    acquiring second position information of the touch operation;
    determining an activation order of a plurality of touch positions that are comprised in the second position information; and
    obtaining the recognition result according to the activation order of the plurality of touch positions that are comprised in the second position information.

4. The display processing method according to claim 3, wherein in a case where the recognition result indicates that the activation order of the plurality of touch positions in the second position information is from the first touch operation area to a second touch operation area, a data content that is displayed in the first display area is switched to be displayed in a second display area; and
    the second touch operation area corresponds to the second display area.

5. The display processing method according to claim 4, wherein the electronic device comprises a plurality of display areas, the electronic device is configured to receive data of a plurality of display signal sources, and each display area of the electronic device is adapted to display a data content of one of the display signal sources.

6. The display processing method according to claim 3, wherein in a case where the recognition result indicates that the activation order of the plurality of touch positions in the second position information is transferred by a touch position, the first display area is enlarged/reduced.

7. The display processing method according to claim 1, wherein the touch operation device comprises a touch screen or a touch panel.

8. An electronic device, comprising:
    a processor; and
    a non-transitory memory that is configured to store computer program instructions, wherein the computer program instructions are adapted to be executed by the processor to enable the processor to perform a following method comprising:
        acquiring a touch operation on a first display area, wherein the touch operation is detected by a touch operation device;
        recognizing the touch operation according to a preset rule to obtain a recognition result; and
        generating a control instruction based on the recognition result to control a display operation of the electronic device;
        wherein the touch operation device and the electronic device are separately provided, and the touch operation device comprises a plurality of touch operation areas for touch operation and has a display function;
        the electronic device comprises a plurality of display areas, and the plurality of touch operation areas are in one-to-one correspondence with the plurality of display areas.

9. The electronic device according to claim 8, wherein the computer program instructions are further adapted to be executed by the processor to enable the processor to perform the following operations:
    acquiring a first position of the touch operation;
    determining whether holding time of the touch operation on the first position exceeds a threshold and obtaining a determination result; and
    in a case where the determination result indicates that the holding time of the touch operation on the first position exceeds the threshold and the first position is located at a first touch operation area corresponding to the first display area, activating the first display area.

10. The electronic device according to claim 9, wherein in a case where the first display area is activated, the computer program instructions are further adapted to be executed by the processor to enable the processor to perform the following operations:
    acquiring second position information of the touch operation;
    determining an activation order of a plurality of touch positions that are comprised in the second position information; and
    obtaining the recognition result according to the activation order of the plurality of touch positions that are comprised in the second position information.

11. The electronic device according to claim 10, wherein in a case where the recognition result indicates that the activation order of the plurality of touch positions in the second position information is from the first touch operation area to a second touch operation area, a data content that is displayed in the first display area is switched to be displayed in a second display area; and the second touch operation area corresponds to the second display area.

12. The electronic device according to claim 11, wherein the electronic device comprises a plurality of display areas, the electronic device receives data of a plurality of display signal sources, and each display area of the electronic device displays a data content of one the display signal sources.

13. The electronic device according to claim 10, wherein in a case where the recognition result indicates that the activation order of the plurality of touch positions in the second position information is transferred by a touch position, the first display area is enlarged/reduced.

14. The electronic device according to claim 8, wherein the touch operation device comprises a touch screen or a touch panel.

15. A display processing system, comprising:
a plurality of display signal sources;
a touch operation device; and
an electronic device according to claim 8, wherein the electronic device is configured to receive data of the plurality of display signal sources.

* * * * *